United States Patent [19]

Hurlock et al.

[11] 4,255,545

[45] Mar. 10, 1981

[54] DISCRETE BEAD POLYMER PROCESS

[75] Inventors: John R. Hurlock, Hickory Hills; Louis A. Goretta, Naperville, both of Ill.

[73] Assignee: Nalco Chemical Company, Oak Brook, Ill.

[21] Appl. No.: 109,985

[22] Filed: Jan. 7, 1980

[51] Int. Cl.$^3$ .............................................. C08F 2/00
[52] U.S. Cl. ................................. 526/201; 525/274; 525/288
[58] Field of Search ............... 526/201; 525/288, 274; 260/33.6 UA, 33.8 UA

[56] References Cited

U.S. PATENT DOCUMENTS 4,011,388  3/1977  Murphy et al. .................. 526/201

Primary Examiner—J. Ziegler
Attorney, Agent, or Firm—Kinzer, Plyer, Dorn & McEachran

[57] ABSTRACT

Discrete particles of sodium polyacrylate of high molecular weight and in which the majority of the particle size is in the range of not less than 0.5 mm. nor more than 1.0 mm. diameter are achieved, in an economy of production, by suspension polymerization in stages of 40° C. (2 hours), 50° C. (2 hours) and 60° C. (2 hours) in the presence of a protective colloid.

2 Claims, 2 Drawing Figures

DISCRETE BEAD POLYMER PROCESS

SUMMARY OF THE INVENTION

This invention is concerned with the production of polysodium acrylate of high molecular weight, greater than ten million on dry bead form.

The polyacrylate is itself water soluble but because of the high molecular weight, even a five percent solution would be comparable in viscosity to a Jell-O pudding, not easily transportable. Therefore, it is preferable to have the polyacrylate in latex form which may be thirty percent active, a particle size of, say, one to two microns in suspension.

Nevertheless, the latex is not always stable, especially in extremely hot or extremely cold weather in areas of the world where the polymer is being used for secondary or tertiary oil recovery, as in Saudi Arabia or Alaska. Another use of the polyacrylate is as a coagulant for water clarification. Because of instability, the polymer solids separate out and settle in the bottom of the drum or other shipping container.

The problems inherent with the water solution and the latex are solved by producing polysodium acrylate of high molecular weight in essential dry bead form, nearly one hundred percent active, constituting the primary object of the present invention. As a general rule, the larger the polymer spheres or beads, up to a certain point, the easier it is to drain or free the polymer from the suspending hydrocarbon solvent occluded during polymerization. However, the smaller the polymer spheres, the easier it is to free the beads of water occluded during polymerization, and to dissolve them rapidly in water at any given temperature. Fisheye formation is also eliminated when applying this polymer form. Therefore, polymer beads must be neither too small nor too large in order to combine the best of the above characteristics in a single polymer bead product. The drier the product, the easier it is to transport and have assurance of stability. The customer will dissolve the beads in water, making his own product for use in the field, whether in oil recovery, water clarification, or whatever.

Another object of the invention is to produce the beads as discrete, symmetrical particles in the optimum diameter for easy drainage of the hydrocarbon phase after polymerization, together with ultimate ease of water solution by the customer. The more discrete and the more symmetrical the beads the more readily they dissolve. Since efficiency of the polymer seems to be keyed to the molecular weight, another object is to develop production parameters for a high molecular weight product which also achieves the foregoing objectives.

In accordance with the present invention, in achieving the objects set forth above, the polymer is produced in suspension (suspension polymerization), the liquid medium being a homogeneous miscible mixture of a hydrocarbon solvent, a protective colloid and water. The water allows the monomer (sodium acrylate) to travel to the polymerizing sites; the oil or solvent dissolves the protective colloid and is selected to have about the same density or specific gravity as the aqueous monomer solution, it also serves as a heat-transfer medium, and it keeps the suspension stable during reaction; the protective colloid has both hydrophilic and hydrophobic characteristics by which the protective colloid isolates and contracts the water droplets as tiny reactors where polymerization takes place.

EXAMPLE (No. 221)

Figure 1:
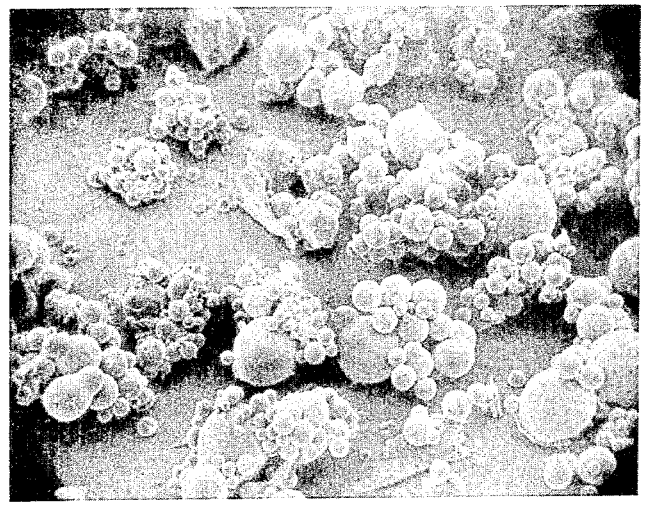
FIG. 1 is a photograph (50×) showing the form of undesired aggregates.
Figure 2:
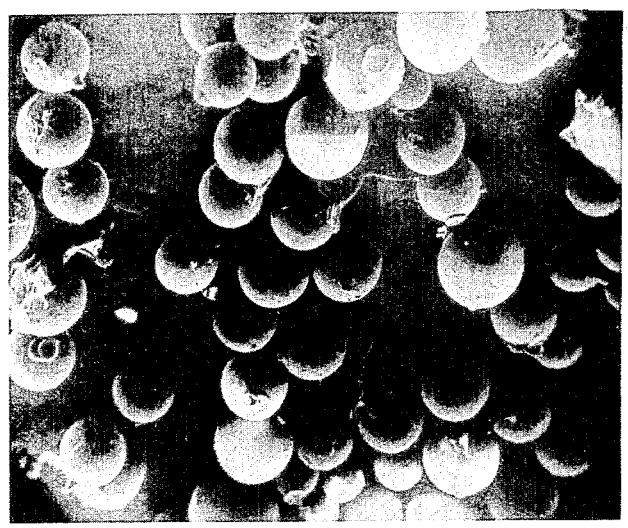
FIG. 2 is a photograph (20×) showing discrete beads.

Preparation of Polysodium Acrylate Beads in Suspension

| Example (No.221) Preparation of Polysodium Acrylate Beads in Suspension | |
|---|---|
| Reagents | Weights, Grams |
| Acrylic Acid | 15.35 |
| Water | 20.40 |
| Sodium Hydroxide (pH 8.5) | 16.75 |
| Catalyst (2.5% in $H_2O$) | 1.0 ml |
| Toluene (Solvent) | 148 |
| Tetrachloroethylene (Solvent | 245 |
| Polymethyl Methacrylate (Protective Colloid: Aldrich I.V. = 1.2) | 4.2 |

Procedure:

The protective colloid was dissolved in the solvent system contained in a suitable reactor by heating to 60° C., then cooled to 40° C. and agitated 400 RPM. The catalyst was dissolved in the aqueous (pH 8.5) sodium acrylate monomer and this was added to the reactor while agitating at 400 RPM. An $N_2$ sparge was applied (rate of 1500 cc per minute) and after five minutes at 54° C. the polymer was observed forming on the thermometer. Polymerization was allowed to continue for three hours at 60° C. (plus or minus 2°).

The $N_2$ sparge was discontinued, twenty five ml. of $H_2O$ was distilled off over a ninety minute period at 92°-112° C. The reaction mixture was cooled and then filtered to recover the polymer, polysodium acrylate which had been thus separated by azestropic distillation.

The polymer was screened through a No. 18 and No. 35 sieve to separate smaller discrete beads of polymer from aggregates:

A—1.3 grams of larger than 2.5 mm beads and aggregates;

B—15.0 grams 1.0-2.5 mm beads; intrinsic viscosity 14.0, RSV of 16.7 and salt viscosity 140 cps.

C—6.1 grams of 0.5 to 1.0 mm beads; intrinsic viscosity of 9.68, RSV of 10.7 and salt viscosity of 125 cps.

D—0.1 grams of less than or equal to 0.5 mm beads

The above example is experiment No. 221 tabulated in the following table along with many other similar experiments for which the principles of the present invention were derived:

TABLE

Suspension Polymerization of An Aqueous Solution of Sodium Acrylate

| 1. Reaction Conditions | | | |
|---|---|---|---|
| % | % Poly Sodium | Catalyst | Reaction |

TABLE-continued
Suspension Polymerization of An Aqueous Solution of Sodium Acrylate

| Exp. No. | PMMA | Acrylate | % BOM | °C.** | Time - Hrs. |
|---|---|---|---|---|---|
| 212 | 0.53 | 4.6 | 0.13 | 60 | 3 |
| 221 | 1.07 | 4.6 | 0.13 | 60 | 3 |
| 224 | 1.62 | 4.6 | 0.13 | 60 | 3 |
| 242* | 0.53 | 4.6 | 0.13 | 60 | 3 |
| 236* | 1.07 | 4.6 | 0.13 | 60 | 3 |
| 246* | 1.67 | 4.6 | 0.13 | 60 | 3 |
| 254 | 1.07 | 4.6 | 0.10 | 60 | 3 |
| 252 | 1.07 | 4.6 | 1.0 | 40 | 3 |
| 250 | 1.07 | 4.6 | 2.0 | 40 | 3 |
| 248 | 1.07 | 4.6 | 0.40 | 50 | 3 |
| 251 | 1.07 | 4.6 | 0.50 | 50 | 3 |
| 253 | 1.07 | 4.6 | 0.050 | 70 | 3 |
| 249 | 1.07 | 4.6 | 0.0625 | 70 | 3 |
| 252 | 1.07 | 4.6 | 1.0 | 40 | 3 |
| 261 | 1.07 | 8.0 | 1.0 | 40 | 3 |
| 262 | 1.07 | 10.8 | 1.0 | 40 | 3 |
| 265 | 1.07 | 12.9 | 1.0 | 40 | 3 |
| 266 | 1.07 | 12.9 | 1.0 | 40 | 6 |
| 270 | 1.07 | 12.9 | 1.5 | 40 | 6 |
| 271 | 1.07 | 12.9 | 0.15 | 40 | 6 |
| 273 | 1.07 | 12.9 | 0.5 | 40 | 6 |

2. Product

| Exp. No. | Yield % BOM | Bead Form | I.V. | % Particle Sizes (mm.) | | | |
|---|---|---|---|---|---|---|---|
| | | | | 2.5 | 1.0 | 0.5 | 0.5 |
| 212 | 120 | A | 13.5 | — | 100 | 0 | 0 |
| 221 | 112.5 | D | 14.0 | 6 | 67 | 27 | 0 |
| 224 | 127.5 | A | 9.0 | — | 100 | 0 | 0 |
| 242 | 120 | A | 11.0 | — | 96 | 3 | 1 |
| 236 | 123.6 | A | 9.6 | — | 98 | 1 | 1 |
| 246 | 122.5 | A | 11.2 | — | 94 | 4 | 2 |
| 254 | 121 | D/A | 13.1 | 36 | 40 | 23 | 0 |
| 252 | 111.5 | D | 10.0 | 3 | 8 | 84 | 4 |
| 250 | 115.5 | D | 7.8 | 0 | 7 | 88 | 5 |
| 248 | 109 | D | 13.1 | 5 | 50 | 45 | 0 |
| 251 | 122.5 | D | 14.3 | 36 | 38 | 25 | 1 |
| 253 | 127 | D/A | 9.6 | 95 | 5 | 0 | 0 |
| 249 | 122 | D | 8.5 | 83 | 16 | 1 | 0 |
| 252 | 111.5 | D | 10.0 | 3 | 8 | 84 | 4 |
| 261 | 120.0 | D | 10.2 | 9 | 35 | 35 | 1 |
| 262 | 113.0 | D | 8.5 | 4 | 52 | 44 | 1 |
| 265 | 114.0 | A | 5.8 | 47 | 37 | 15 | 1 |
| 266 | 45 | D | 11.7 | 8 | 1 | 51 | 40 |
| 270 | 52 | D | 13.4 | 72 | 13 | 36 | 28 |
| 271 | 125 | D | 13.2 | 3 | 3 | 91 | 3 |
| 273 | 112 | D | 15.9 | 5 | 16 | 74 | 6 |

*All reactions agitated at 400 RPM except * which were 800 RPM
**Plus or minus 2°
PMMA = Polymethyl methacrylate; weight % oil phase
BOM = Based on monomer
A = Aggregate
D = Discrete Referring to the tabulated data, consistent aggregation under Nos. 242, 236 and 246 can be explained as caused by excessive agitation (800 RPM v. 400 RPM) and consequent high rate of collision amongst the polymer particles, contrary to the expectation that agitation would encourage the formation of smaller particles.

The earliest experiments (212, 221, 224) established that the optimum concentration of protective colloid (PMMA) was a little over one percent by weight, based on the weight of the oil phase. This again was contrary to the expectation that more colloid would result in smaller particles of polymer. In all subsequent experiments the concentration of protective colloid was therefore maintained at 1.07.

Exp. No. 221 resulted in the desired discrete polymer particles rather than clumps of particles (aggregates) but the preference is for a majority of the particle size in the one-half to one millimeter size, that is, not less than one-half mm. nor more than one mm., a criterion not met by No. 221. Also, we want a molecular weight equivalent to not less than about ten I.V. The preferred particle size represents ease in dissolving the beads in water for field use and the lower limit of molecular weight is related to the commercial effectiveness of the polymer.

A lower temperature (50°) and less catalyst resulted in a more favorable particle size distribution and acceptable molecular weight, No. 248, but with a little more catalyst (No. 251) some aggregation was encounered.

A considerably higher temperature of 70° C. (No. 249 and 253) resulted in a disadvantageous shift to the higher particle size and lower molecular weight.

An even lower temperature (No. 252 at 40° C.) resulted in the desired particle size distribution and the molecular weight was acceptable; note that more catalyst (No. 250) did not improve the product.

Thus, experiment Nos. 248 and 252 (at 50° and 40°, respectively) produced the desired discrete, high molecular weight polymer in a satisfactory particle size distribution but this was achieved at a low loading, yielding only 4.6% polymer (theoretical) based on the total weight of the whole system in the reactor.

Therefore, the effort became one of finding a way to impart more economy in terms of reacted product in the reactor as shown by the sequence Nos. 252, 261, 262 and 265 at 40° C. where the loading was increased in steps from 4.6% to 12.9%. No result exceeded that of No. 252 by an appreciable margin.

The reaction time at 40° C. was increased for runs 266 and 270. Unreacted monomer and all water were then extracted from the polymer beads with methanol. Thus it was determined that the yield (i.e. conversion of monomer to polymer) had dropped off, and had not been increased even by adding more catalyst (1.5% BOM in 270). Molecular weights were adequate, but particle sizes were barely in the desired size range for 270.

By staging the rection time and temperature, two hours at 40° C., two hours at 50° C. and two hours at 60° C. (Nos. 271, 273) we achieved discrete particles of satisfactory molecular weight in the desired particle size distribution with a high yield. Thus, experiment No. 273 represents the preferred practice.

Two other protective colloids were tried, namely, ethyl cellulose and ethyl hydroxy ethyl cellulose dissolved in the same oil as in the experiments above, but discrete beads of the desired particle size distribution could not be obtained. We also found the same undesired result when trying to produce the polymer by using PMMA (the effective protective colloid) dissolved in toluene alone. We do not conclude from this that there are no equivalents to the system PMMA/Toluene-Tetrachloroethylene, but we do conclude that there are protective colloid/hydrocarbon solvent systems which are ineffective for our purposes.

It will be seen from the foregoing that the advantage for staging the reaction is economy of production represented by heavy loading of the reactor (No. 273), but it should be noted that beads which are predominately discrete, of the desired high molecular weight and of the preferred particle size distribution can be obtained otherwise, e.g. No. 252 (at 40° C.) which is unstaged. In any event, both staged and unstaged reactions enable polymer beads predominately of greater than 0.5 mm. and not more than 1 mm. (largest) diameter to be filtered or separated from the reaction mixture in any preferred way and dried for shipment; also, one percent or less residual monomer is found, characterizing a highly efficient reaction. The catalyst is a free radical catalyst, e.g. Vazo 50 which is 2,2'-azobis-2-amidino propane hydrochloride.

The embodiments of the invention in which an exclusive property or privilege is claimed are defined as follows:

1. A method of producing polysodium acrylate in essentially dry bead form free of aggregate, having a particle size distribution such that the majority of particles are in the range of 0.5 to 1 mm. diameter with few of greater than 2.5 mm. or less than 0.5 mm. comprising:

polymerizing aqueous sodium acrylate monomer in a body of hydrocarbon solvent in the form of toluene-tetrachloroethylene hydrocarbon solvent in which is dissolved a protective colloid in the form of polymethyl methacrylate;

and separating the resultant polymer particles which are essentially free of water and unreacted monomer.

2. A method according to claim 1 in which polymerization is in stages: 40° C. for about two hours, 50° C. for about two hours and 60° C. for about two hours.

* * * * *